United States Patent
Kniepkamp

[15] 3,692,971
[45] Sept. 19, 1972

[54] METHOD AND APPARATUS FOR OVERLAYING WELD METAL WHICH PREVENTS THE EMISSION OF NOXIOUS GASES THEREFROM

[72] Inventor: Glenn E. Kniepkamp, Allegheny, Pa.

[73] Assignee: United States Steel Corporation

[22] Filed: March 25, 1971

[21] Appl. No.: 127,903

[52] U.S. Cl. .....................219/73, 219/74, 219/146
[51] Int. Cl. .......................................................B23k
[58] Field of Search...........................219/73, 74, 146

[56] References Cited

UNITED STATES PATENTS

| | | |
|---|---|---|
| 3,424,892 | 1/1969 | Wilcox.......................219/146 |
| 2,591,926 | 4/1952 | Gibson et al..................219/74 |
| 3,047,713 | 7/1962 | Liptak..........................219/74 |
| 3,192,356 | 6/1965 | Shrubsall.....................219/73 |
| 3,211,887 | 10/1965 | Cotterman...................219/73 |
| 3,024,349 | 3/1962 | Hinrichsen et al...........219/73 |
| 3,139,508 | 6/1964 | Freeman et al..............219/74 |

Primary Examiner—William H. Beha, Jr.
Attorney—Ralph H. Dougherty

[57] ABSTRACT

An inert-gas-shielded submerged arc welding process which prevents emission of noxious gases when overlaying aluminum bronze on a steel base.

Apparatus is also disclosed for confining granular flux in the proximity of a welding torch when making an overlay on a cylindrical surface.

10 Claims, 2 Drawing Figures

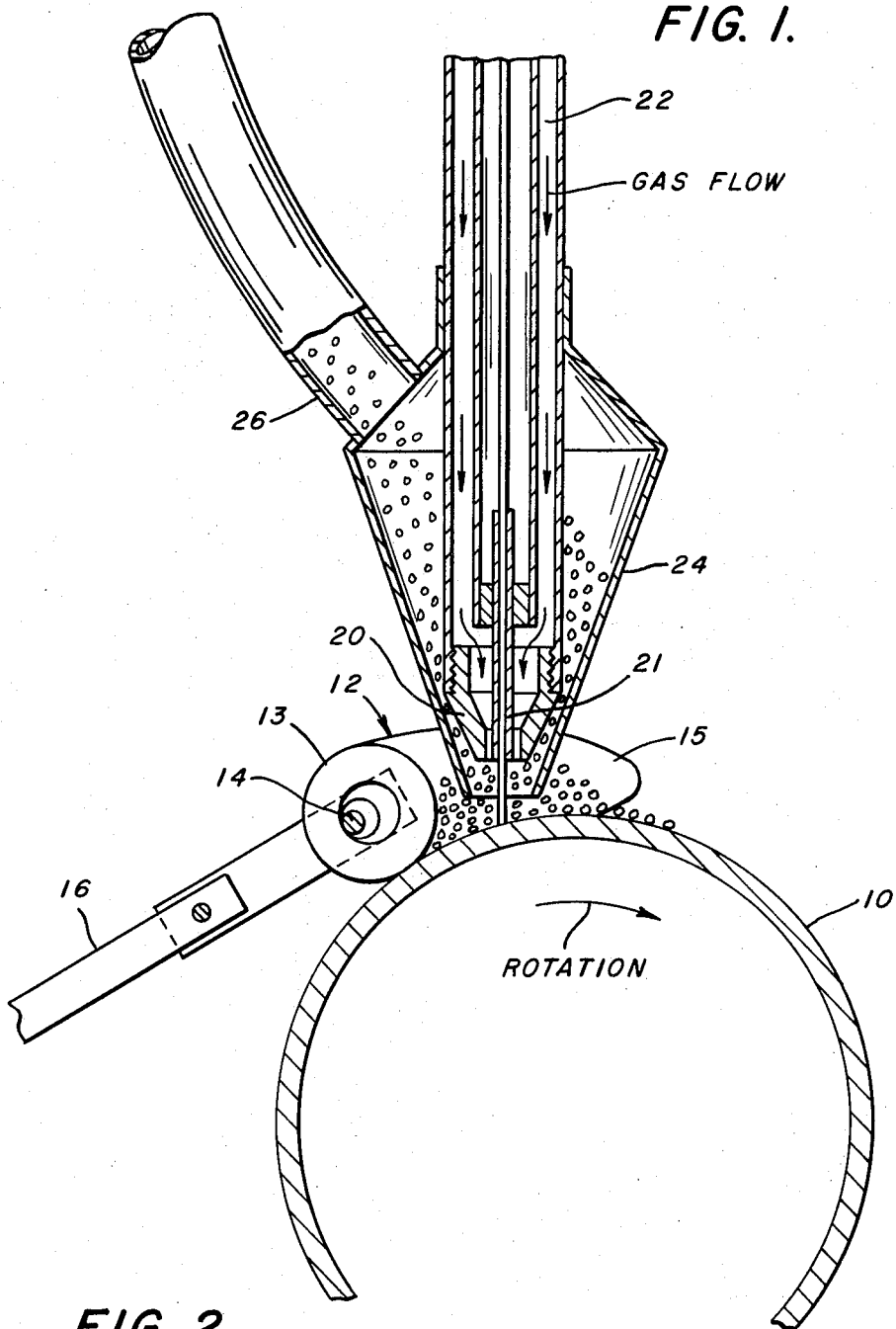
FIG. 1.
FIG. 2.
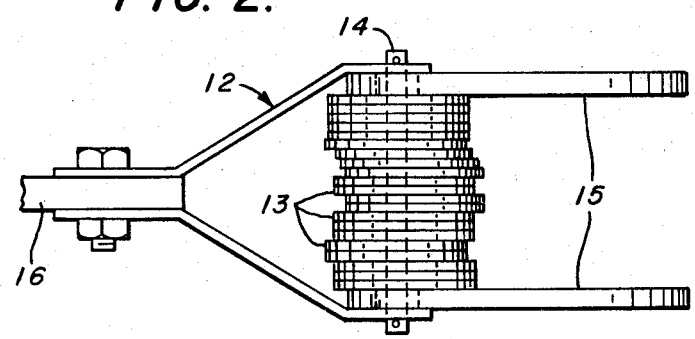
INVENTOR.
GLENN E. KNIEPKAMP
By Ralph Dougherty
Attorney

METHOD AND APPARATUS FOR OVERLAYING WELD METAL WHICH PREVENTS THE EMISSION OF NOXIOUS GASES THEREFROM

This invention relates to a method of preventing emission of noxious gases when overlaying aluminum bronze weld material on a steel base.

The method of making an aluminum bronze overlay used heretofore consists of welding a layer of aluminum bronze on the base by the inert-gas-shielded arc welding process. The shielding gas is argon or helium or a mixture of argon and helium. Several health hazards are associated with the process due to high arc temperatures and high ultraviolet and infra-red radiation. Trichlorethylene, and perchlorethylene which often are found in the air of an industrial plant surrounding the arc, are decomposed by radiation from the arc. Phosgene and other gases are produced in dangerous quantity, even where the trichlorethylene and perchlorethylene concentrations are low. The high temperature involved in the gas-shielded arc welding process produces larger amounts of metal fumes than other welding processes. The fumes are given off as black smoke which causes the welders and others in the vicinity of the work to become nauseous, contract a high temperature, and show other signs of phosgene poisoning.

In addition to the health hazard outlined above, the process causes a rough black film to be deposited on the weld bead. This deposit is tightly adherent to the bead and actually enters the pores of the weld metal. As this black film interferes with adherence of each subsequent pass, it must be ground off before a subsequent pass is made.

I have found that by employing the submerged arc welding process with the proper flux and shielding it with the proper gas mixture, I prevent the release of noxious fumes into the atmosphere.

When making an overlay on a cylindrical surface, granular flux admitted to the area of the weld tends to slide off the cylindrical surface, roll off of it, or if the flux is molten, to run off the surface. In order to use my process, flux must be retained in the area of the weld until a skin has solidified on the molten weld bead.

It is the principal object of the subject invention to prevent the emission of noxious fumes and smoke when welding aluminum bronze overlays.

It is also an object to improve the quality of the weld.

It is a further object to reduce the amount of time required for a welder to make such weld.

It is also an object to reduce the amount of shielding gas required in the welding process.

It is also an object to provide apparatus for retaining flux in the proper location until the weld has been made.

These and other objects will become more apparent by reference to the following specification and the appended drawing in which:

FIG. 1 is a cross-section of a piston, apparatus for overlaying aluminum bronze thereon, a welding torch and a flux fence.

FIG. 2 is a partial plan view of the flux fence.

My invention is especially useful for overlaying aluminum bronze on worn pistons. FIG. 1 shows a piston 10 which is rotatably mounted in conventional means (not shown) for welding of an aluminum bronze overlay on the cylindrical surface thereof. A flux fence 12, which has a multiplicity of smooth, washer-like wheels 13 journaled on a shaft 14 and a pair of curved peripherally extending members or sides 15, is brought into contact with the piston. The fence is held in position by fixing support handle 16 in a tool holder or other conventional means (not shown). A welding head 20 includes means for continuously feeding a welding rod 21 therethrough, a passageway 22 for admitting shielding gas and a flux funnel 24. Flux is fed from a hopper, not shown, through sleeve 26 to flux funnel 24.

In operation, flux is fed from the funnel 24 onto the surface of piston 10 between sides 15 of fence 12. The wheels 13 and the sides 15 of the fence each have a large central opening through which shaft 14 passes. Thus each wheel is free to slide around shaft 14, rotate around shaft 14 or be angularly displaced with respect to any other wheel. Also, each side may move in its plane without moving the wheel adjacent to it. Aluminum bronze welding rod 21 is fed through the welding head to strike an arc between the base material and the welding rod and rotation of the piston is commenced. After the piston has made one revolution, an overlay is present which is the width of a single weld bead. The end wheel thereupon rides atop this bead and as more weld material is added, each successive wheel rides atop the overlay. Thus no flux is lost except for the excess which rides on the piston and falls off after passing the welding head. A shielding gas is introduced to the weld area through passageway 22 to shield the molten metal from the surrounding atmosphere.

It is critical to use an argon-helium mixture as the shielding gas. The mixture consists of between 10 and 60 percent argon with the remainder helium. The optimum gas composition is 20 percent argon, 80 percent helium. I have found the optimum gas flow rate to be 40 cubic feet per hour helium and 10 cubic feet per hour argon or a total flow rate of 50 cubic feet per hour. The prior method required a much greater argon flow, that is, 33 cubic feet per hour argon as well as 25 cubic feet per hour helium or a total flow rate of 58 cubic feet per hour of shielding gas. Thus the prior method required 16 percent more shielding gas than does my invention.

It is critical to use a neutral flux, having a composition range as follows:

| | | | |
|---|---|---|---|
| $SiO_2$ | 18–25% | $P_2O_5$ | .03–.07% |
| $Al_2O_3$ | 25–35% | S | .01 max. |
| CaO | 8–13% | $TiO_2$ | .5–1.5% |
| MgO | 12–20% | FeO | 1.5–2.5% |
| MnO | 11–15% | $Na_2O$ | 1.0–2.0% |

My preferred flux composition range is as follows:

| | | | |
|---|---|---|---|
| $SiO_2$ | 21.0–23.0% | $P_2O_5$ | 0.05–0.07% |
| $Al_2O_3$ | 29.0–32.0% | S | .01 max. |
| CaO | 10.0–12.0% | $TiO_2$ | 0.8–1.2% |
| MgO | 16.0–18.0% | FeO | 2.0–2.3% |
| MnO | 13.0–14.0% | $Na_2O$ | 1.3–1.6% |

The optimum flux composition is as follows:

| | | | |
|---|---|---|---|
| $SiO_2$ | 22.3% | $P_2O_5$ | .06% |
| $Al_2O_3$ | 31.0% | S | .01 max. |
| CaO | 11.0% | $TiO_2$ | 1.02% |
| MgO | 17.0% | FeO | 2.2% |
| MnO | 14.0% | $Na_2O$ | 1.4% |

A suitable flux is commercially available from Lincoln Electric Company of Cleveland, Ohio, and carries their designation Lincoln 860.

The theory regarding the prevention of noxious fumes to which I subscribe but do not wish to be held is as follows:

Since aluminum reacts with chlorine instantaneously to form aluminum chloride, I believe that the high percentage of alumina in the flux, as well as the large amount of aluminum present in the welding rod, causes the aluminum chloride reaction to take place rather than the formation of toxic gases.

The overlay, when made by my process, has high integrity and is bright and shiny, having no trace of the black film present in the prior method. As a result, it is unnecessary to grind one pass before beginning another pass. This is a considerable saving in operating time.

Unexpectedly, it was found that only four welding passes are now required to cover the base metal to the depth of overlay which previously required five passes. Undoubtedly, a portion of the improvement is due to the fact that grinding is not required after each pass, but the remainder of the improvement is believed to be caused by the shape of the weld bead.

The apparatus by which I perform my process is similar to that disclosed in Craig et al. U.S. Pat. No. 2,947,847. I differ from the teachings of this patent as I am making an overlay and not joining two pieces of metal; my weld metal is aluminum bronze, a different material, and I employ a different flux from that of the reference.

It is readily apparent from the foregoing that I have invented a method and apparatus for overlaying weld metal which prevents emission of noxious gases during the performance of the method, yields an improved quality weld, yet requires less time and less shielding gas than in prior methods.

I claim:

1. A method for preventing the emission of noxious gases during the welding of an aluminum-containing overlay on a metal base comprising:
   depositing on the base metal a flux containing as its five principle ingredients aluminum oxide, silicon dioxide, magnesium oxide, manganese oxide and calcium oxide;
   striking an arc between the metal base and an aluminum-alloy-containing electrode;
   shielding the weld metal with an inert gas mixture consisting of 10 to 60 percent argon with the remainder helium;
   depositing a tightly adherent weld bath on the base metal, said method characterized by a reaction between aluminum from the flux and the electrode with chlorine from chlorine-containing compounds present in the surrounding atmosphere to form aluminum chloride rather than toxic gases.

2. A method as defined in claim 1 in which said inert-gas mixture consists of 20 percent by volume argon and 80 percent by volume helium.

3. A method as defined in claim 1 in which a flux fence is placed on said base and said flux is deposited within said fence.

4. A method as defined in claim 1 in which said overlay is aluminum bronze.

5. A method for preventing the emission of noxious gases during the welding of an aluminum-containing overlay on a metal base comprising:
   depositing on the base metal a flux consisting essentially of:

|       |         |          |          |
|-------|---------|----------|----------|
| $SiO_2$ | 18–25%  | $P_2O_5$ | .03–.07% |
| $Al_2O_3$ | 25–35%  | S        | .01 max. |
| CaO   | 8–13%   | $TiO_2$  | .5–1.5%  |
| MgO   | 12–20%  | FeO      | 1.5–2.5% |
| MnO   | 11–15%  | $Na_2O$  | 1.0–2.0% | striking an arc between the metal base and an alloy-containing electrode;
   shielding the weld metal with an inert-gas mixture consisting of 10 to 60 percent argon with the remainder helium; and
   depositing a tightly adherent weld bead on the base metal.

6. A method as defined in claim 5 in which said flux consists essentially of:

|       |            |          |           |
|-------|------------|----------|-----------|
| $SiO_2$ | 21.0–23.0% | $P_2O_5$ | 0.05–0.07% |
| $Al_2O_3$ | 29.0–32.0% | S        | .01 max.  |
| CaO   | 10.0–12.0% | $TiO_2$  | 0.8–1.2%  |
| MgO   | 16.0–18.0% | FeO      | 2.0–2.3%  |
| MnO   | 13.0–14.0% | $Na_2O$  | 1.3–1.6%  |

7. A method as defined in claim 5 in which said inert-gas mixture consists of 20 percent by volume argon and 80 percent by volume helium.

8. A method as defined in claim 5 in which a flux fence is placed on said base and said flux is deposited within said fence.

9. A method as defined in claim 5 in which said overlay is aluminum bronze.

10. A method as defined in claim 5 in which said metal base is steel.

* * * * *

UNITED STATES PATENT OFFICE
CERTIFICATE OF CORRECTION

Patent No. 3,692,971        Dated September 19, 1972

Inventor(s)  GLENN E. KNIEPKAMP

It is certified that error appears in the above-identified patent and that said Letters Patent are hereby corrected as shown below:

On the cover sheet, delete "[73] Assignee:

United States Steel Corporation".

Signed and sealed this 8th day of May 1973.

(SEAL)
Attest:

EDWARD M. FLETCHER, JR.          ROBERT GOTTSCHALK
Attesting Officer                Commissioner of Patents